(12) United States Patent
Zhao

(10) Patent No.: US 11,558,772 B2
(45) Date of Patent: Jan. 17, 2023

(54) BUFFER STATUS REPORTING METHOD AND DEVICE, AND COMPUTER STORAGE MEDIUM

(71) Applicant: China Academy of Telecommunications Technology, Beijing (CN)

(72) Inventor: Yali Zhao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 103 days.

(21) Appl. No.: 16/968,184

(22) PCT Filed: Jan. 23, 2019

(86) PCT No.: PCT/CN2019/072856
§ 371 (c)(1),
(2) Date: Aug. 7, 2020

(87) PCT Pub. No.: WO2019/154089
PCT Pub. Date: Aug. 15, 2019

(65) Prior Publication Data
US 2021/0377785 A1 Dec. 2, 2021

(30) Foreign Application Priority Data
Feb. 9, 2018 (CN) .......................... 201810135644.X

(51) Int. Cl.
*H04W 28/02* (2009.01)
*H04W 72/12* (2009.01)

(52) U.S. Cl.
CPC ... *H04W 28/0278* (2013.01); *H04W 72/1252* (2013.01)

(58) Field of Classification Search
CPC ...................... H04W 28/0278; H04W 72/1252
See application file for complete search history.

(56) References Cited

U.S. PATENT DOCUMENTS

2016/0337895 A1* 11/2016 Lee ................... H04W 28/0205
2017/0245292 A1* 8/2017 Agiwal ................. H04W 72/10
(Continued)

FOREIGN PATENT DOCUMENTS

| CN | 101778473 A | 7/2010 |
|---|---|---|
| CN | 105432028 A | 3/2016 |

(Continued)

OTHER PUBLICATIONS

Catt,"Impact of PDCP duplication on MAC", 3GPP TSG-RAN WG2 Meeting #NR AH2, Qingdao, China, Jun. 27-29, 2017, total 4 pages, R2-1706372.

(Continued)

*Primary Examiner* — Christopher M Crutchfield
*Assistant Examiner* — Tito Q Pham
(74) *Attorney, Agent, or Firm* — Kilpatrick Townsend & Stockton, LLP

(57) ABSTRACT

Provided is a buffer status reporting method, comprising: for any radio bearer with duplication function configured or activated on a link, determining that different logic channels of the radio bearer belong to different logic channel groups; and when a buffer status reporting condition is satisfied, performing a buffer status reporting procedure based on the buffer status of the different logic channel groups.

23 Claims, 7 Drawing Sheets receiving buffer status of a buffer status reporting procedure performed by a terminal based on buffer status of different logic channel groups, where different logic channels, corresponding to any RB with a duplication function configured or activated on a link, belong to the different logic channel groups — S901 acquiring current buffer status of the terminal from the buffer status of the buffer status reporting procedure performed based on the buffer status of the different logic channel groups — S902

(56) References Cited

U.S. PATENT DOCUMENTS

| | | | | |
|---|---|---|---|---|
| 2017/0257876 | A1* | 9/2017 | Loehr | H04W 72/10 |
| 2018/0317130 | A1* | 11/2018 | Jin | H04W 24/10 |
| 2019/0182639 | A1* | 6/2019 | Basu Mallick | H04W 72/10 |
| 2019/0268799 | A1* | 8/2019 | Hong | H04W 28/0278 |

FOREIGN PATENT DOCUMENTS

| | | |
|---|---|---|
| CN | 107241164 A | 10/2017 |
| CN | 107295658 A | 10/2017 |
| WO | 2011137576 A1 | 11/2011 |
| WO | 2013182035 A1 | 12/2013 |
| WO | 2014161168 A1 | 10/2014 |

OTHER PUBLICATIONS

Zte,"Consideration on the Impact of PDCP Duplication on MAC", 3GPP TSG-RAN WG2#NR_AdHoc#2, Qingdao, China, Jun. 27-29, 2017, total 4 pages, R2-1706643.

Qualcomm Incorporated,"Impact of PDCP Duplication on BSR Procedure in the CA case",3GPP TSG-RAN WG2 Meeting RAN2 #99bis, Prague, Czech, gth_Oct. 13, 2017, total 3 pages, R2-1711705, Resubmission of R2-1709118.

Zte,"Discussion on sidelink resource request mechanism in PC5 CA", 3GPP TSG-RAN WG2 Meeting #100, Reno, USA, Nov. 27-Dec. 1, 2017, total 7 pages, R2-1713072.

Huawei et al.,"BSR procedure for data duplication", 3GPP TSG-RAN WG2 Ad Hoc, Vancouver, Canada, Jan. 22-Jan. 26, 2018, total 3 pages, R2-1800201, Resubmission of R2-1712730.

Intel Corporation, "Open aspects of priority handling for Prose communication", 3GPP TSG RAN WG2 Meeting #91, Malmo, Sweden, Oct. 5-9, 2015, total 5 pages, R2-154385.

Catt,"PDCP Duplication", 3GPP TSG-RAN WG2 Meeting #97bis, Spokane, USA, Apr. 3-7, 2017, total 3 pages, R2-1703114.

Catt,"Duplication Bearer Type", 3GPP TSG-RAN WG2 #99, Berlin, Germany, Aug. 21-25, 2017, total 5 pages, R2-1707925.

LG Electronics Inc.,"PDCP duplication impacts for MAC", 3GPP TSG-RAN2 NR AH 1801, Vancouver, Canada, Jan. 22-Jan. 26, 2018, total 3 pages, R2-1801238.

Qualcomm Incorporated,"Buffer status reporting for PDCP duplication",3GPP TSG-RAN WG2 Meeting NR ad-hoc #1, Vancouver, Canada, Jan. 22-26, 2018, total 3 pages, R2-1801431(Revision of R2-1711705).

Ericsson,"MAC CE details for activation and deactivation of PDCP data duplication", 3GPP TSG-RAN WG2 #99, Berlin, Germany, Aug. 21-25, 2017, total 3 pages, R2-1708331.

* cited by examiner

BUFFER STATUS REPORTING METHOD AND DEVICE, AND COMPUTER STORAGE MEDIUM

The present disclosure is a US National Stage of International Application No. PCT/CN2019/072856, filed on Jan. 23, 2019, which claims priority of the Chinese Patent Application No. 201810135644.X filed with the China Patent Office on Feb. 9, 2018, and entitled "BUFFER AREA STATE REPORTING METHOD AND DEVICE, AND COMPUTER STORAGE MEDIUM", both of which are hereby incorporated by reference in their entireties.

FIELD

The present disclosure relates to the field of communication, and in particular to a buffer status reporting method and device, and a computer storage medium.

BACKGROUND

A wireless communication system is a system based on scheduling. In the system, network side equipment allocates time-frequency resources required by data transmission to a terminal, and the terminal receives downlink data or sends uplink data according to a scheduling command of the network side equipment, where during uplink data transmission, a network side equipment scheduler informs the terminal through UL grant (uplink grant) after determining uplink resource allocation condition. And uplink resource allocation carried out by the network side equipment scheduler is based on the volume of uplink data to be sent by the terminal, namely buffer status of the terminal. The buffer is arranged at a terminal side, and when the network side equipment needs to acquire this information, the terminal needs to carry out Buffer Status Reporting (BSR) to a base station.

SUMMARY

Embodiments of the present disclosure provide a buffer status reporting method and device, and a computer storage medium.

The buffer status reporting method provided by an embodiment of the present disclosure includes:

determining, for any radio bearer (RB) with duplication function configured or activated on a link, different logical channels of the RB belonging to different logic channel groups; and performing a buffer status reporting procedure based on buffer status of the different logic channel groups when a buffer status reporting condition is met.

In one embodiment, the link is a direct communication link from a terminal to another terminal (Sidelink), or a communication link from a terminal to a network side equipment (Uu link).

Thus, the present disclosure is not limited to whether the link is the Sidelink or the Uu link, as long as there is the RB, with the duplication function configured or activated, on the link.

In one embodiment, the operation of performing the buffer status reporting procedure based on the buffer status of the different logic channel groups includes:

performing the buffer status reporting procedure for the different logic channel groups based on buffer status of the different logic channels of the RB with duplication function configured or activated.

In one embodiment, the operation of performing the buffer status reporting procedure for the different logic channel groups based on the buffer status of the different logic channels of the RB with duplication function configured or activated, includes:

sending, for the Uu link, a buffer status reporting media access control element (BSR MAC CE), and the BSR MAC CE comprises information of the different logic channel groups, and information of buffer status corresponding to each of the different logic channel groups; and sending, for the Sidelink, a BSR MAC CE, and the BSR MAC CE comprises a Destination L2 ID, information of one or more logic channel groups corresponding to the Destination L2 ID, and information of buffer status corresponding to each of the one or more logic channel groups.

In the above embodiment, the BSR MAC CE includes the different logic channel groups, and buffer status corresponding to each of the different logic channel groups.

In one embodiment, the operation of determining the different logic channels of the RB belonging to the different logic channel groups includes:

determining the different logic channels of the RB belonging to the different logic channel groups according to a corresponding relationship between a logic channel of the RB and a logic channel group; or determining the different logic channels of the RB belonging to the different logic channel groups according to a calculation formula with regarding to a logic channel of the RB and a logic channel group.

In one embodiment, the calculation formula is as follows:

LCG ID=$A+M\times(i-1)$; or

LCG ID=$N-M\times(i-1)-A$ where i represents an $i^{th}$ logic channel of the RB, LCG ID represents a serial number of a logic channel group to which the $i^{th}$ logic channel of the RB belongs, A represents a serial number of a logic channel group to which a first logic channel of the RB belongs, M represents a number of the logic channels of the RB, N represents a maximum value of serial numbers of logic channel groups supported by system, i is less than or equal to M, and M is an integer greater than or equal to 2.

In one embodiment, the corresponding relationship and/or the calculation formula is directly appointed according to a protocol, or the corresponding relationship and/or the calculation formula is configured by the network side equipment.

In one embodiment, when the corresponding relationship and/or the calculation formula is configured by the network side equipment, the method further includes:

receiving a configuration signaling carrying information of the corresponding relationship or the calculation formula from the network side equipment through a broadcast; or receiving a configuration signaling carrying information of the corresponding relationship or the calculation formula from the network side equipment through a dedicated signaling.

In one embodiment, when different types of links use different corresponding relationships or different calculation formulas, the broadcast carries an identification of the link; or the dedicated signaling carries an identification of the link.

In one embodiment, when different corresponding relationships or different calculation formulas are used for different destinations in a Sidelink, the broadcast carries a Destination L2 ID; or the dedicated signaling carries a Destination L2 ID.

A buffer status determination method provided by an embodiment of the present disclosure includes:

receiving buffer status of a buffer status reporting procedure performed by a terminal based on buffer status of different logic channel groups, and different logic channels, corresponding to any RB with a duplication function configured or activated on a link, belong to the different logic channel groups; and acquiring current buffer status of the terminal from the buffer status of the buffer status reporting procedure performed based on the buffer status of the different logic channel groups.

In one embodiment, the method also includes:

determining a plurality of different logic channel groups corresponding to the RB according to the buffer status;

scheduling data corresponding to the different logic channel groups carried by the RB to different physical resources, according to the current buffer status of the terminal and a corresponding relationship between a logic channel of the RB and a logic channel group; or scheduling data corresponding to the different logic channel groups carried by the RB to different physical resources, according to the current buffer status of the terminal and a calculation formula with regarding to a logic channel of the RB and a logic channel group.

In one embodiment, the corresponding relationship and/or the calculation formula is directly appointed according to a protocol, or the corresponding relationship and/or the calculation formula is configured for the terminal after being determined by a network side equipment.

In one embodiment, the mode of configuring the corresponding relationship or the calculation formula for the terminal is as follows:

sending a configuration signaling carrying information of the corresponding relationship or the calculation formula to the terminal through a broadcast; or sending a configuration signaling carrying information of the corresponding relationship or the calculation formula to the terminal through a dedicated signaling.

A buffer status reporting device provided by an embodiment of the present disclosure includes:

a memory for storing program commands; and a processor for calling the program commands stored in the memory to execute the following operations according to obtained programs:

determining, for any RB with duplication function configured or activated on a link, different logic channels of the RB belonging to different logic channel groups; and performing a buffer status reporting procedure based on buffer status of the different logic channel groups when a buffer status reporting condition is met.

In one embodiment, the link is a Sidelink, or a Uu link.

In one embodiment, when the buffer status reporting procedure is preformed based on buffer status of the different logic channel groups, the processor is further for:

performing the buffer status reporting procedure for the different logic channel groups based on buffer status of the different logic channels of the RB with duplication function configured or activated.

In one embodiment, when the buffer status reporting procedure is performed for the different logic channel groups based on the buffer status of the different logic channels of the RB with duplication function configured or activated, the processor is further for:

sending, for the Uu link, a BSR MAC CE, where the BSR MAC CE includes information of the different logic channel groups, and information of buffer status corresponding to each of the different logic channel groups; and sending, for the Sidelink, a BSR MAC CE, where the BSR MAC CE includes a Destination L2 ID, information of one or more logic channel groups corresponding to the Destination L2 ID, and information of buffer status corresponding to each of the one or more logic channel groups.

In one embodiment, when determining that the different logic channels of the RB belonging to the different logic channel groups, the processor is further for:

determining the different logic channels of the RB belonging to the different logic channel groups according to a corresponding relationship between a logic channel of the RB and a logic channel group; or determining the different logic channels of the RB belonging to the different logic channel groups according to a calculation formula with regarding to a logic channel of the RB and a logic channel group.

In one embodiment, the calculation formula is as follows:

$$\text{LCG ID} = A + M \times (i-1); \text{ or}$$

$$\text{LCG ID} = N - M \times (i-1) - A$$

where i represents an $i^{th}$ logic channel of the RB, LCG ID represents a serial number of a logic channel group to which the $i^{th}$ logic channel of the RB belongs, A represents a serial number of a logic channel group to which a first logic channel of the RB belongs, M represents a number of the logic channels of the RB, N represents a maximum value of serial numbers of logic channel groups supported by system, i is less than or equal to M, and M is an integer greater than or equal to 2.

In one embodiment, the corresponding relationship and/or the calculation formula is directly appointed according to a protocol, or the corresponding relationship and/or the calculation formula is configured by the network side equipment.

In one embodiment, when the corresponding relationship and/or the calculation formula is configured by the network side equipment, the processor is further for:

receiving a configuration signaling carrying information of the corresponding relationship or the calculation formula from the network side equipment through a broadcast; or receiving a configuration signaling carrying information of the corresponding relationship or the calculation formula from the network side equipment through a dedicated signaling.

In one embodiment, when different types of links use different corresponding relationships or different calculation formulas:

the broadcast carries an identification of the link; or the dedicated signaling carries an identification of the link.

In one embodiment, when different corresponding relationships or different calculation formulas are used for different target terminals in a Sidelink:

the broadcast carries a Destination L2 ID; or the dedicated signaling carries a Destination L2 ID.

A buffer status determination device provided by an embodiment of the present disclosure includes:

a memory for storing program commands; and a processor for calling the program commands stored in the memory to execute following operations according to obtained programs:

receiving buffer status of a buffer status reporting procedure performed by a terminal based on buffer status of different logic channel groups, and different logic channels, corresponding to any RB with a duplication function configured or activated on a link, belong to the different logic channel groups; and acquiring current buffer status of the terminal from the buffer status of the buffer status reporting procedure performed based on the buffer status of the different logic channel groups.

In one embodiment, the processor is further for:

determining a plurality of different logic channel groups corresponding to the RB according to the buffer status;

scheduling data corresponding to the different logic channel groups carried by the RB to different physical resources, according to the current buffer status of the terminal and a corresponding relationship between a logic channel of the RB and a logic channel group; or scheduling data corresponding to the different logic channel groups carried by the RB to different physical resources, according to the current buffer status of the terminal and a calculation formula with regarding to a logic channel of the RB and a logic channel group.

In one embodiment, the corresponding relationship and/or the calculation formula is directly appointed according to a protocol, or the corresponding relationship and/or the calculation formula is configured for the terminal after being determined by network side equipment.

In one embodiment, the mode of configuring the corresponding relationship or the calculation formula for the terminal is as follows:

sending a configuration signaling carrying information of the corresponding relationship or the calculation formula to the terminal through a broadcast; or sending a configuration signaling carrying information of the corresponding relationship or the calculation formula to the terminal through a dedicated signaling.

Another buffer status reporting device provided by an embodiment of the present disclosure includes:

a determination device for determining, for any RB with a duplication function configured or activated on a link, different logic channels of the RB belonging to different logic channel groups; and a reporting device for performing a buffer status reporting procedure based on buffer status of the different logic channel groups when a buffer status reporting condition is met.

Another buffer status determination device provided by an embodiment of the present disclosure includes:

a receiving device for receiving buffer status of a buffer status reporting procedure performed by a terminal based on buffer status of different logic channel groups, and different logic channels, corresponding to any RB with a duplication function configured or activated on a link, belong to the different logic channel groups; and an acquiring device for acquiring current buffer status of the terminal from the buffer status of the buffer status reporting procedure performed based on the buffer status of the different logic channel groups.

A computer storage medium provided by an embodiment of the present disclosure stores computer executable commands, and the computer executable commands enables a computer to execute any above-mentioned method.

BRIEF DESCRIPTION OF THE DRAWINGS

Embodiments of the present disclosure will briefly introduce in the accompanying drawings required in description of the embodiments.

DETAILED DESCRIPTION OF THE EMBODIMENTS

Embodiments of the present disclosure provide a buffer status reporting method and device, and a computer storage medium, for reporting buffer status of a terminal based on different logic channel groups to which different logic channels corresponding to a radio bearer (RB) with a duplication function configured or activated belong, and improving the reliability of data transmission.

The duplication function is explained as follows.

In order to adapt to higher requirements of services on time delay and reliability, Packet Data Convergence Protocol (PDCP) duplication is introduced into a solution given by a current 3rd Generation partnership project (3GPP), that is, a same Protocol Data Unit (PDU) of PDCP layer is transmitted through a plurality of paths, so that through transmission of the plurality of paths, transmission reliability can be improved, transmission delay can be reduced, and user experience can be improved.

Figure 1:
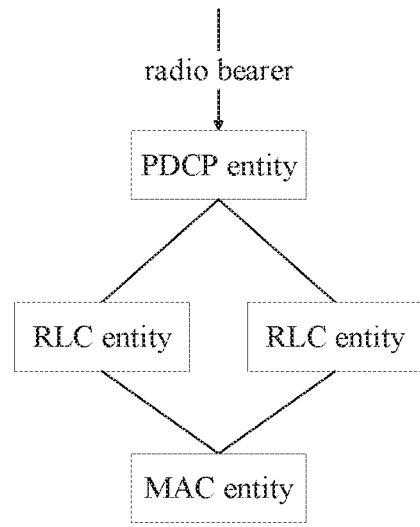
FIG. 1 is a structure schematic diagram of a PDCP duplication model in the related art.

A PDCP duplication model, referring to FIG. 1, includes a PDCP layer, a Radio Link Control (RLC) layer, and a Media Access Control (MAC) layer. One RB of the PDCP layer corresponds to a PDCP entity, data transmission is carried out on the RLC layer through two Logic Channels (LC), each logic channel is in correspondence with a RLC entity, and in the MAC layer, data processing is carried out by an MAC entity, which maps data from the two different logic channels to different physical resources for transmission, for example, to different carriers.

Figure 2:
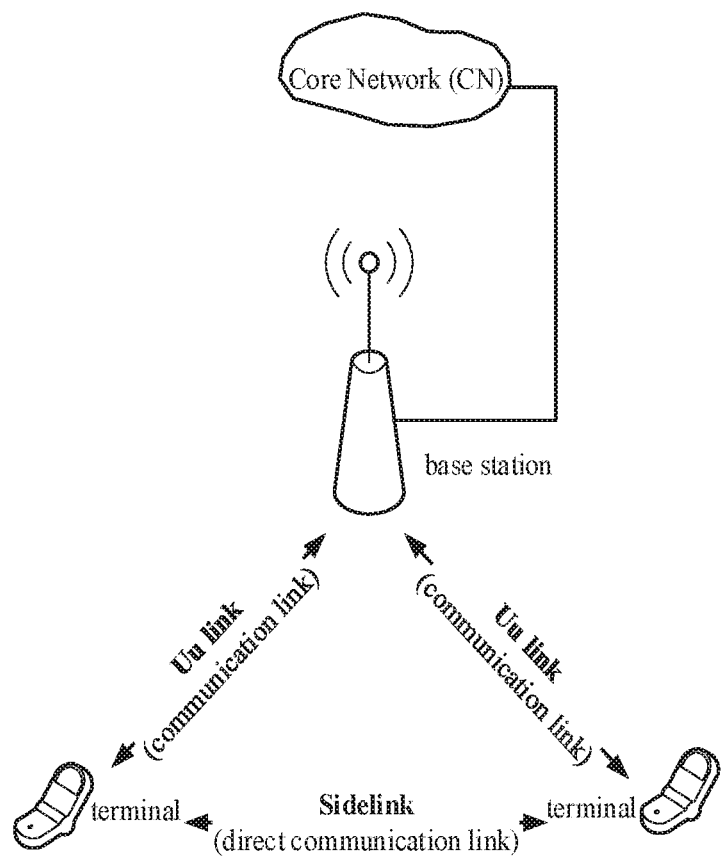
FIG. 2 is a schematic diagram of data communication of terminal in a cellular network in the related art.

Moreover, the applicant finds that the terminals which are close to each other can communicate with each other through network side equipment, and of course can also directly communicate with each other in research. As shown in FIG. 2, a link for direct communication between a terminal to another terminal is defined herein as a terminal-to-terminal communication link Sidelink, and a communication link between a terminal and a network side equipment is defined herein as a Uu link from the terminal to the network side equipment.

For a buffer status reporting mechanism of the Sidelink, the network side equipment configures a mapping relationship between a Logic Channel Group (LCG) and a ProSe Per-packet Priority (PPPP) for the terminal. When the terminal needs to report the buffer status, the LCGs corresponding to the PPPPs of the logic channels are determined according to the PPPPs of the logic channels which need to transmit data, then a data volume corresponding to each LCG is determined, and the Sidelink BSR MAC CE is packaged and reported to the network side equipment. However, if the Sidelink supports the duplication function, according to the above-mentioned mechanism, the PPPPs of the data of the two logic channels corresponding to the RB with the duplication function activated are the same, so that only one LCG can be determined according to the mapping relationships between the LCGs and the PPPPs. Besides, according to the design mode of the Sidelink BSR MAC CE, one LCG corresponds to one buffer status (BS) domain name, so that the buffer status is reported via one LCG, when the terminal reports the buffer status to the network side equipment, then the network side equipment can only identify the data corresponding to one logic channel group after receiving the buffer status reported by the terminal, and cannot identify the same data corresponding to the different logic channel groups, and thus the same data corresponding to the RB with the duplication function activated cannot be scheduled to the different physical resources, and obtaining of gain of the duplication function cannot be guaranteed.

However, the buffer status reporting mechanism of the Uu link also has a similar problem, that is, the network side equipment generally divides the RBs and LCGs according to Quality of Service (QoS), and the LCGs to which the LCs corresponding to the RB with the duplication function belong are also classified as one LCG, so that after receiving the buffer status reported by the terminal, the network side equipment cannot schedule the data corresponding to the RB with the duplication function activated to the different physical resources either, and thus obtaining of the gain of the duplication function cannot be guaranteed.

Figure 3:
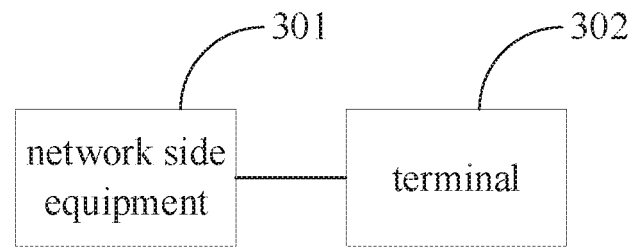
FIG. 3 is a structure schematic diagram of a system for determining buffer status provided by an embodiment of the present disclosure.

Accordingly, a buffer status determination system is provided by an embodiment of the present disclosure, as shown in FIG. 3, which includes network side equipment 301 and a terminal 302.

The terminal 302 is for determining, for any RB with the duplication function configured or activated on a specified link, the different logic channels of the RB belonging to the different logic channel groups; and performing a buffer status procedure based on the buffer status of the different logic channel groups when a buffer status reporting condition is met.

The network side equipment 301 is for receiving the buffer status of the buffer status procedure performed based on the buffer status of the different logic channel groups, where the different logic channels corresponding to the any RB with the duplication function configured or activated, on the certain link belong to the different logic channel groups; and acquiring the current buffer status of the terminal 302 from the buffer status of the buffer status procedure performed based on the buffer status of the different logic channel groups.

In one embodiment, in the embodiment of the present disclosure, before the terminal 302 determines that the different logic channels of the RB with the duplication function configured or activated, belong to the different logic channel, the terminal 302 is also for judging that whether the specified link is provided with the RBs with the duplication function configured or activated.

In some embodiments, the terminal 302 can make a judgment according to control information of the network side equipment 301, and can also make a judgment according to a preset strategy of the terminal 302. If it is judged that the specified link is provided with the RBs with the duplication function configured or activated, for any one of the RBs, the different logic channels of the RB belonging to the different logic channel groups is determined. If it is judged that the specified link is not provided with the RBs with the duplication function configured or activated, the terminal 302 does not need to execute the operation of determining the different logic channels of the RB belonging to the different logic channel groups.

It should be noted that the RB with the duplication function configured or activated may be interpreted as the RB with the duplication function activated already configured on the specified link, or the RB with inactivated duplication function configured on the specified link, and then the duplication function of the RB is activated.

In one embodiment, in the embodiment of the present disclosure, when the terminal 302 determines that the different logic channels of the RB with the duplication function configured or activated belong to the different logic channel groups, the operation may include: the different logic channels of the RB with the duplication function configured or activated belonging to the different logic channel groups is determined according to the corresponding relationship or calculation formula between a logic channel of the RB with the duplication function configured or activated and a logic channel group.

In some embodiments, according to the corresponding relationship between the logic channel of the RB with the duplication function configured or activated and the logic channel group, the different logic channel groups to which the different logic channels corresponding to the RB with the duplication function configured or activated belong can be directly found in the corresponding relationship, so that the terminal 302 can simply and quickly determine the logic channel groups, operation complexity of the buffer status determination system can be simplified, and work efficiency can be improved.

Taking the number of the logic channels that can be used at most by one RB with the duplication function configured or activated is two as an example. In the two logic channels, the first logic channel is the logic channel corresponding to the RB before activation and can be represented by LC1, and the other logic channel is newly added after the duplication function of the RB is activated, and is represented by LC2. The corresponding relationships between the different logic channels corresponding to the RB with the duplication function configured or activated and the logic channel groups can refer to a table shown in the Table. 1, the left column represents the LCG ID of the logic channel group to which LC1 belongs, and the right column represents the LCG ID of the logic channel group to which LC2 belongs.

Moreover, one logic channel group may include the plurality of RBs, where the duplication function may be configured or activated for part of the RBs, and the duplication function may be not configured or activated for part of the RBs. In the present disclosure, only the RBs with the duplication function configured or activated are concerned, so that only the corresponding relationships between the different logic channels corresponding to the RBs configured or activated with the repetition function and the logic channel groups is given in Table 1.

TABLE 1

| RB ID | the identification of the logic channel group to which the first logic channel corresponding to the RB belongs | the identification of the logic channel group to which the newly added logic channel corresponding to the RB belongs |
|---|---|---|
| 1 | 1 | 9 |
| 3 | 2 | 10 |
| 4 | 3 | 11 |
| 2 | 4 | 12 |
| 1 | 5 | 13 |
| 4 | 6 | 14 |
| 3 | 7 | 15 |
| 1 | 8 | 16 |

As can be seen from the Table 1, the logic channel group to which the first logic channel corresponding to the RB1 belongs is the first group; the logic channel group to which the newly added logic channel corresponding to the RB1 belongs is the ninth group. In one embodiment, the logic channel groups to which the two logic channels corresponding to the RB1 with the duplication function configured or activated belong are different; similarly, for the RB3, the logic channel group to which the first logic channel corresponding to the RB3 belongs is the second group, the logic channel group to which the newly added logic channel corresponding to the RB3 belongs is the tenth group, and the logic channel groups to which the two logic channels corresponding to the RB3 with the duplication function configured or activated belong are also different. Therefore, the terminal 302 can report the buffer status via the different logic channel groups.

Of course, when the different logic channels belonging to the different logic channel groups is determined, the logic channel groups may also be determined according to the calculation formula with regarding to a logic channel of the RB with the duplication function configured or activated and a logic channel group; and in some embodiments, there may be two calculation formulas as follows:

$$LCG\ ID = A + M \times (i-1); \text{ or}$$

$$LCG\ ID = N - M \times (i-1) - A;$$

where i represents the $i^{th}$ logic channel of the RB with the duplication function configured or activated, LCG ID represents the serial number of the logic channel group to which the $i^{th}$ logic channel of the RB with the duplication function configured or activated belongs, A represents the serial number of the logic channel group to which the first logic channel of the RB with the duplication function configured or activated belongs, M represents the number of the logic channels of one RB with the duplication function configured or activated, N represents the maximum value of the serial numbers of the logic channel groups supported by the system, i is not greater than M, and M is an integer not less than 2.

Therefore, the relationships between the different logic channels of the RB with the duplication function configured or activated and the logic channel groups can be determined according to the above-mentioned calculation formulas, so that the terminal 302 is facilitated to determine that the different logic channels of the RB with the duplication function configured or activated belong to different logic channel groups.

Of course, the calculation formulas between the different logic channels of the RB with the duplication function configured or activated and the logic channel groups are not limited to the two formulas above, can also be other calculation formulas which can give relations between the different logic channels of the RB with the duplication function configured or activated and the logic channel groups, and are not limited here.

In one embodiment, the corresponding relationships or calculation formulas between the different logic channels of the RB with the duplication function configured or activated and the logic channel groups mentioned in the embodiment of the present disclosure may be obtained by any one of the following ways:
 directly appointing according to the protocol; and
 being configured by the network side equipment 301.

Moreover, when the network side equipment 301 configures the corresponding relationship or calculation formula for the terminal 302, the terminal 302 is also used for receiving the configuration signaling which is sent by the network side equipment through the broadcast or dedicated signaling, and the broadcast or the dedicated signaling carries the information of the corresponding relationship or the calculation formula, so that the terminal 302 obtains the corresponding relationship and the calculation formula, and thus the terminal 302 is facilitated to determine that the different logic channels of the RB with the duplication function configured or activated belong to the different logic channel groups according to the corresponding relationship or calculation formula.

It should be noted that the embodiment of the present disclosure is for any RB, with the duplication function configured or activated, on the specified link. The specified link may be the terminal-to-terminal Sidelink, or may be the Uu link from the terminal 302 to the network side equipment 301. However, no matter on the Sidelink or the Uu link, the terminal 302 needs to determine that the different logic channels of the RB with the duplication function configured or activated belong to the different logic channel groups as long as the link has a RB with the duplication function configured or activated on it, so that the buffer status can be conveniently reported through the different logic channel groups.

Moreover, since the above-mentioned ways aim at a specified link on which any RB with the duplication function is configured or activated, the corresponding relationships or calculation formulas between the different logic channels of the RB with the duplication function configured or activated and the logic channel groups has certain relation with the type of the link, that is, the corresponding relationships or calculation formulas adopted by the links of different types can be the same, so that the complexity of system operation can be effectively reduced. Of course, in order to improve accuracy of the terminal 302 in determining the logic channel groups on the different links, the corresponding relationships or calculation formulas adopted by the links of different types may also be different. In this case, no matter the corresponding relationships or calculation formulas are appointed according to the protocol or configured by the network side equipment 301, the identifications for indicating the links are required, for example, if the corresponding relationships or calculation formulas between the logic channels and the logic channel groups are configured by the network side equipment, an identification of a link is carried in the broadcast or dedicated signaling to distinguish the types of the links.

For the Sidelink, due to the fact that the Sidelink is the terminal-to-terminal link, the Sidelinks between the different target terminals may be different, so that the corresponding relationships or the calculation formulas adopted for the different target terminals may be the same to reduce the complexity of system operation. Of course, the corresponding relationships or calculation formulas adopted for the different destinations may also be different, in this case, no matter the corresponding relationships or calculation formulas are appointed according to the protocol or configured by the network side equipment 301, the Destination L2 ID for indicating the destinations are required, for example, Destination L2 ID of a destination is carried in the broadcast or dedicated signaling to distinguish the different Sidelinks.

In one embodiment, in the embodiment of the present disclosure, the operation that when the buffer status reporting condition is met, the terminal 302 performs a buffer status reporting procedure based on the buffer status of the different logic channel groups, may include: the buffer status reporting procedure is performed for the different logic channel groups based on buffer status of the different logic channels of the RB with the duplication function configured or activated.

The buffer status reporting condition may be a triggering condition that satisfies the buffer status reporting of the link, and Uu interface uplink resources required by transmission of the link BSR MAC CE. The triggering condition can be that the current link buffer status is changed into non-empty status from empty status, but is not limited to this.

For example, for the Uu link, the buffer status reporting conditions include: any of the Uu link BSR triggering conditions is met and there is enough Uu UL resource to convey the Uu link BSR MAC CE; and for the Sidelink, the buffer status reporting conditions include: any of the Sidelink BSR triggering conditions is met, and there is enough Uu UL resource to convey the Sidelink BSR MAC CE.

Based on characteristics of the duplication function, if the terminal 302 performs a buffer status reporting procedure based on buffer status of the different logic channel groups, the network side equipment 301 can determine which logic channel groups include the data volume (the data volume is the buffer status) of the different logic channels corresponding to the RB with the duplication function configured or activated, according to the buffer status and the corresponding relationships or calculation formulas between the logic channel groups corresponding to the RB with the duplication function configured or activated and the different logic channel groups, after receiving the buffer status. And the data corresponding to the determined logic channel groups need to be scheduled to the different physical resources to guarantee the gain of the duplication function.

In some embodiments, the operation that the terminal 302 performs the buffer status reporting procedure for the different logic channel groups based on the buffer status of the different logic channels of the RB with the duplication function configured or activated may include:

for the Uu link, the BSR MAC CE is sent, where the BSR MAC CE includes information of the different logic channel groups and the information of buffer status corresponding to each of the different logic channel groups; and for the Sidelink, the BSR MAC CE is sent, where the BSR MAC CE includes the Destination L2 ID, the information of one or more logic channel groups corresponding to the Destination L2 ID, and information of buffer status corresponding to each of the one or more logic channel groups.

In some embodiments, when the terminal 302 performs the buffer status reporting procedure for the network side equipment 301, the buffer status is generally reported in the mode of sending the BSR MAC CE, and the BSR MAC CE at least includes the information of the logic channel groups and the buffer status of the logic channel groups, where the Sidelink is the link between the terminal 302 and another terminal 302, so that it is also required to include the Destination L2 ID in the BSR MAC CE; and the logic channel group information between the terminal 302 and the different destinations is different, so that the logic channel group information included in the BSR MAC CE is in correspondence with the Destination L2 ID. That is, for the Sidelink, the BSR MAC CE includes the Destination L2 ID, the information of the logic channel groups corresponding to the Destination ID, and the information of buffer status corresponding to the logic channel groups. Since the Uu link is the link between the terminal 302 and the network side equipment 301 which does not involve the destination, it is not necessary to include the Destination L2 ID in the BSR MAC CE, and only the information of the determined logic channel groups and the information of buffer status corresponding to the determined logic channel groups is required. Therefore, for the different links, the BSR MAC CEs sent by the terminal 302 include different information, so that the network side equipment 301 can perform corresponding operation according to the information included in the BSR MAC CE after receiving the BSR MAC CE, and operation accuracy of the network side equipment 301 can be improved.

It should be noted that before the above-mentioned BSR MAC CE is sent, according to the determined different logic channel groups to which the different logic channels corresponding to the RB with the duplication function configured or activated belong, the buffer status corresponding to which logic channel groups can be determined to be reported, and a specific buffer status value can be determined to be used for organizing the BSR MAC CE, so that the terminal 302 can perform the buffer status reporting procedure for the network side equipment 301.

In one embodiment, in the embodiment of the present disclosure, after the network side equipment 301 acquires the buffer status, the network side equipment 301 is also for determining the plurality of different logic channel groups corresponding to the RB with the duplication function configured or activated according to the received buffer status, and scheduling data corresponding to the different logic channel groups borne by the RB with the duplication function configured or activated to the different physical resources according to the current buffer status of the terminal 302 and the corresponding relationships or calculation formulas between the different logic channels of the RB with the duplication function configured or activated and the logic channel groups.

Of course, the above-mentioned physical resources may be carrier resources, may also be a Band Width Part (BWP), or may also be physical resources such as a Transport Block (TB), and are not limited here.

In one embodiment, in the embodiment of the present disclosure, the corresponding relationship and/or calculation formula of the network side equipment 301 may also be directly appointed according to the protocol, or configured for the terminal 302 after being determined by network side equipment 301.

In some embodiments, the mode of configuring the corresponding relationship or calculation formula for the terminal 302 may be as follows:

the configuration signaling carrying the information of the corresponding relationship or calculation formula is sent to the terminal 302 through the broadcast or dedicated signaling.

It should be noted that the configuration signaling can be sent to the terminal 302 from the network side equipment 301 alone, and of course, can also be sent together with a duplication function configuration or activation signaling, so that the network side equipment 301 can also activate the RB with inactivated duplication function on the specified link of the terminal 302 while configuring the corresponding relationship or calculation formula for the terminal 302, which further enables the terminal 302 to perform corresponding operations on the RB with the duplication function activated.

Figure 4A:
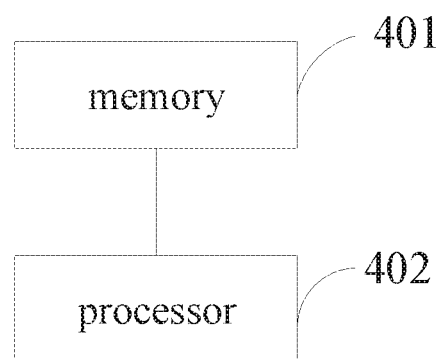
FIG. 4a is a structure schematic diagram of a device for performing a buffer status reporting procedure provided by an embodiment of the present disclosure.

Based on a same concept, an embodiment of the present disclosure provides the buffer status reporting device, such as the terminal, as shown in FIG. 4a, which includes:

the memory 401 for storing the program commands; and the processor 402 for calling the program commands stored in the memory 401 to execute the following operations according to the obtained programs:

determining, for any RB with a duplication function configured or activated on a link, different logical channels of the RB belonging to different logic channel groups; and performing a buffer status reporting procedure based on buffer status of the different logic channel groups when a buffer status reporting condition is met.

The RB with the duplication function configured or activated may be interpreted as the RB with the duplication function activated already configured on the specified link, or the RB with inactivated duplication function configured on the specified link, and then the duplication function of the RB is activated.

The different logic channel groups to which the different logic channels corresponding to the RB belong are determined for the RB with the duplication function configured or activated, so that the buffer status is reported based on the logic channel groups, which helps network side equipment to schedule the data of the different logic channels corresponding to the RB to the different physical resources for transmission after receiving the reported buffer status, and thus transmission delay is reduced while the reliability of data transmission is improved.

In one embodiment, the link is the Sidelink, or the Uu link.

For the Uu link, the above-mentioned buffer status reporting conditions include: any of the Uu link BSR triggering conditions is met, and there is enough Uu UL resource to convey the Uu link BSR MAC CE; and for the Sidelink, the above-mentioned buffer status reporting conditions include: any of the Sidelink BSR triggering conditions is met, and there is enough Uu UL resource to convey the Sidelink BSR MAC CE.

In one embodiment, when the buffer status reporting procedure is performed based on the buffer status of the different logic channel groups, the processor 402 is further for performing the buffer status reporting procedure for the different logic channel groups based on buffer status of the different logic channels of the RB.

The buffer status reporting procedure is performed for the different logic channel groups, which facilitates the network side equipment to schedule the data of the different logic channels of the RB with the duplication function configured or activated to the different physical resources for transmission, after receiving the reported buffer status, and thus transmission delay is reduced while the reliability of data transmission is improved.

Figure 4B:
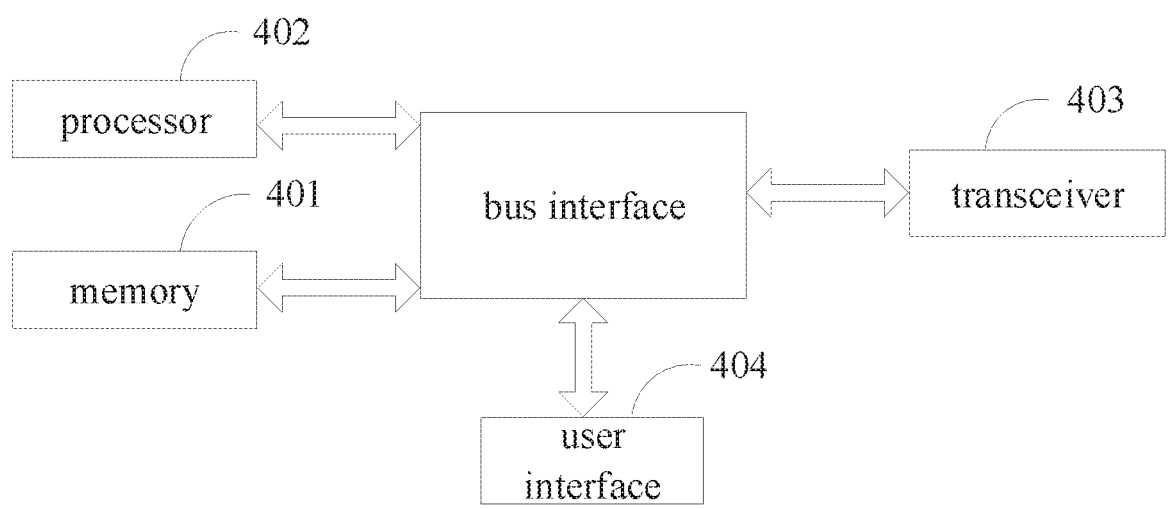
FIG. 4b is a structure schematic diagram of another device for performing a buffer status reporting procedure provided by an embodiment of the present disclosure.

In one embodiment, as shown in FIG. 4b, the buffer state reporting device may also include a transceiver 403;

when the buffer status reporting procedure is performed for the different logic channel groups based on the buffer status of the different logic channels of the RB, the processor 402 is further for:

sending, for the Uu link, a BSR MAC CE via the transceiver 403, where the BSR MAC CE includes information of the different logic channel groups, and information of the buffer status corresponding to each of the different logic channel groups; and sending, for the Sidelink, a BSR MAC CE via the transceiver 403, where the BSR MAC CE includes a Destination L2 ID, information of one or more logic channel groups corresponding to the Destination L2 ID, and information of buffer status corresponding to each of the one or more logic channel groups.

Therefore, the BSR MAC CEs sent for the different links include different information, so that the network side equipment can carry out corresponding operation according to the information included in the BSR MAC CE, after receiving the BSR MAC CE, and operation accuracy of the network side equipment can be improved.

In one embodiment, when the different logic channels corresponding to the RB with the duplication function configured or activated belonging to the different logic channel groups is determined, the processor 402 is further for:

determining the different logic channels of the RB belonging to the different logic channel groups according to a corresponding relationship between a logic channel corresponding to the RB and a logic channel group; or determining the different logic channels of the RB belonging to the different logic channel groups according to a calculation formula with regarding to a logic channel corresponding to the RB and a logic channel group.

In some embodiments, when the different logic channel groups to which the different logic channels corresponding to the RB with the duplication function configured or activated belong are determined, the logic channel group to which the first logic channel corresponding to the RB with the duplication function configured or activated belong can be firstly determined, that is, the logic channel group to which the logic channel corresponding to the RB before activation belong is firstly determined, and then the logic channel group to which the newly added logic channel corresponding to the RB after activation belongs is determined according to the corresponding relationship or calculation formula.

Therefore, when the different logic channels of the RB with the duplication function configured or activated belonging to the different logic groups is determined, the terminal can operate more simply and quickly according to the pre-obtained corresponding relationship between a logic channel and a logic channel group, or calculation formula with regarding to a logic channel and a logic channel group, corresponding to the RB with the duplication function configured or activated.

In one embodiment, the calculation formula is as follows:

LCG ID=$A+M\times(i-1)$; or

LCG ID=$N-M\times(i-1)-A$ where i represents an ith logic channel of the RB, LCG ID represents a serial number of a logic channel group to which the ith logic channel of the RB belongs, A represents a serial number of a logic channel group to which a first logic channel of the RB belongs, M represents number of the logic channels of the RB, N represents a maximum value of serial numbers of logic channel groups supported by system, i is less than or equal to M, and M is an integer greater than or equal to 2.

Of course, the corresponding relationships between the different logic channels corresponding to the RB with the duplication function configured or activated and the different logic channel groups may be obtained by the above-mentioned calculation formulas.

In one embodiment, the corresponding relationship and/or calculation formula is directly appointed according to the protocol, or configured by the network side equipment.

Therefore, the terminal can directly obtain the corresponding relationship or calculation formula through appointment according to the protocol, and the terminal can also obtain the corresponding relationship or calculation formula through configuration for the terminal by the network side equipment, so that the terminal is facilitated to determine that the different logic channels of the RB with the duplication function configured or activated belong to the different logic channel groups according to the corresponding relationship or calculation formula.

In one embodiment, when the corresponding relationship and/or the calculation formula is configured by the network side equipment, the processor 402 is further for:

receiving, via the transceiver 403, a configuration signaling carrying information of the corresponding relationship or the calculation formula from the network side equipment through a broadcast; or receiving, via the transceiver 403, a configuration signaling carrying information of the corresponding relationship or the calculation formula from the network side equipment through a dedicated signaling.

Therefore, the terminal can obtain the corresponding relationship and the calculation formula, so that the terminal is facilitated to determine that the different logic channels of the RB with the duplication function configured or activated belong to the different logic channel groups according to the corresponding relationship or the calculation formula.

In one embodiment, when different types of links use different corresponding relationships or different calculation formulas, the broadcast or dedicated signaling carries identification of the links.

In one embodiment, when different corresponding relationships or different calculation formulas are used for different destinations in a Sidelink, the broadcast or the dedicated signaling carries a Destination L2 ID.

The above-mentioned dedicated signaling may be a Radio Resource Control (RRC) signaling, a MAC signaling, or a physical layer signaling, etc., which is not limited herein.

It should be noted that since the above-mentioned operation aims at a specified link on which any RB with the duplication function configured or activated, the corresponding relationship or calculation formula between the different logic channels corresponding to the RB with the duplication function configured or activated and the logic channel groups has certain relation with the type of the link, that is, the corresponding relationship or calculation formulas adopted by the links of different types may be the same, so that the complexity of system operation may be effectively reduced. Of course, in order to improve accuracy of the terminal in determining the logic channel groups on the different links, the corresponding relationships or calculation formulas adopted by the different types of links may also be different, in this case, no matter the corresponding relationships or calculation formulas are appointed according to the protocol or configured by the network side equipment, the identifications for indicating the links are required, for example, an identification of a link is carried in the broadcast or dedicated signaling to distinguish the types of the links.

For the Sidelink, due to the fact that the Sidelink is the terminal-to-terminal link, the Sidelinks between the different destinations may be different, so that the corresponding relationships or the calculation formulas adopted for the different destinations may be the same to reduce the complexity of system operation. Of course, the corresponding relationships or calculation formulas adopted for the different destinations may also be different, in this case, no matter the corresponding relationships or calculation formulas are appointed according to the protocol or configured by the network side equipment, the Destination L2 ID for indicating the destination are required, for example, a Destination L2 ID is carried in the broadcast or dedicated signaling to distinguish the different Sidelinks.

In the FIG. 4b, a bus architecture may include any numbers of buses and bridges connected to each other, and one or more processors represented by the processor 402 and various circuits of the memories represented by the memory 401 are linked together. The bus architecture may also link other various circuits together, such as peripheral equipment, voltage stabilizers and power management circuits, which are all well known in this field, and thus will not be further described herein. Bus interfaces provide interfaces. The transceiver 403 may include a plurality of elements, namely including a transmitter and a receiver, and provide devices communicating with other devices on a transmission medium. For different user equipment, user interfaces 404 may also be interfaces that can be externally or internally connected to required equipment, and the connected equipment includes, but not limited to, a keypad, a display, a loudspeaker, a microphone, a joystick, and the like.

The processor 402 is responsible for managing the bus architecture and generally processing, and the memory 401 may store the data for the processor 402 executing operation.

The processor 402 in the embodiment of the present disclosure may be a Central Processing Unit (CPU), an Application Specific Integrated Circuit (ASIC), a Field-Programmable Gate Array (FPGA) or a Complex Programmable Logic Device (CPLD).

Figure 5:
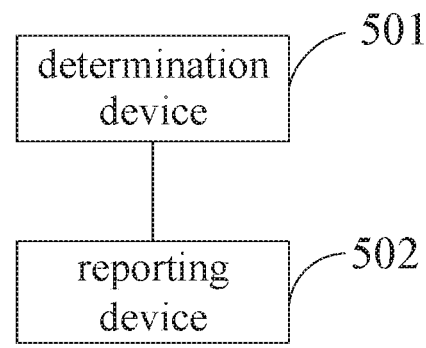
FIG. 5 is a structure schematic diagram of further device for performing a buffer status reporting procedure provided by an embodiment of the present disclosure.

Based on the same concept, an embodiment of the present disclosure provides another buffer status reporting device, such as the terminal, as shown in FIG. 5, which may include:

a determination device 501 for determining, for any RB with a duplication function configured or activated on a link, the different logic channels of the RB belonging to the different logic channel groups; and a reporting device 502 for performing a buffer status reporting procedure based on the buffer status of the different logic channel groups when a buffer status reporting condition is met.

In the embodiment of the present disclosure, both the above-mentioned determination device 501 and reporting device 502 can be implemented by physical devices such as a processor.

Figure 6A:
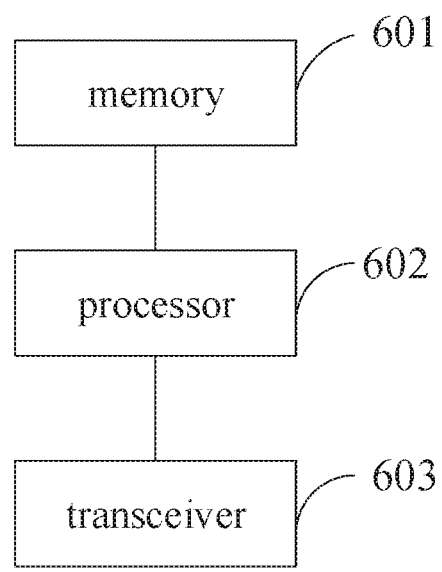
FIG. 6a is a structure schematic diagram of a device for determining buffer status provided by an embodiment of the present disclosure.

Based on the same concept, an embodiment of the present disclosure provides a buffer status determination device, such as a base station and other network side equipment, as shown in FIG. 6a, which may include:

the memory 602, for storing the program commands; and the processor 601, for calling the program commands stored in the memory to execute the following operations according to the obtained programs:

receiving buffer status of a buffer status reporting procedure performed by a terminal based on buffer status of different logic channel groups via the transceiver 603, where different logic channels, corresponding to any RB with a duplication function configured or activated on a link, belong to the different logic channel groups; and acquiring current buffer status of the terminal from the buffer status of the buffer status reporting procedure performed based on the buffer status of the different logic channel groups.

After the buffer status reported by the terminal is received, the network side equipment is facilitated to schedule data of the different logic channels corresponding to the RB with the duplication function configured or activated to the different physical resources for transmission after receiving the reported buffer status, and thus transmission delay is reduced while the reliability of data transmission is improved.

In one embodiment, the processor 601 is also for determining a plurality of different logic channel groups corresponding to the RB according to the buffer status; scheduling data corresponding to the different logic channel groups carried by the RB to different physical resources, according to the current buffer status of the terminal and a corresponding relationship between a logic channel of the RB and a logic channel group; or scheduling data corresponding to the different logic channel groups carried by the RB to different physical resources, according to the current buffer states of the terminal and a calculation formula with regarding to a logic channel of the RB and a logic channel group.

Therefore, when the network side equipment schedules the same data corresponding to the different logic channel groups, the same data can be scheduled to the different physical resources, so that transmission reliability is improved, and transmission delay is reduced.

Of course, the above-mentioned physical resources may be carrier resources, may also be a BWP, or may also be physical resources such as TB, and are not limited here.

In one embodiment, the corresponding relationship and/or calculation formula is directly appointed according to the protocol, or configured for the terminal after being determined by network side equipment.

In one embodiment, the mode of configuring the corresponding relationship or calculation formula for the terminal is as follows:

sending a configuration signaling carrying information of the corresponding relationship or the calculation formula to the terminal through a broadcast or a dedicated signaling.

Figure 6B:
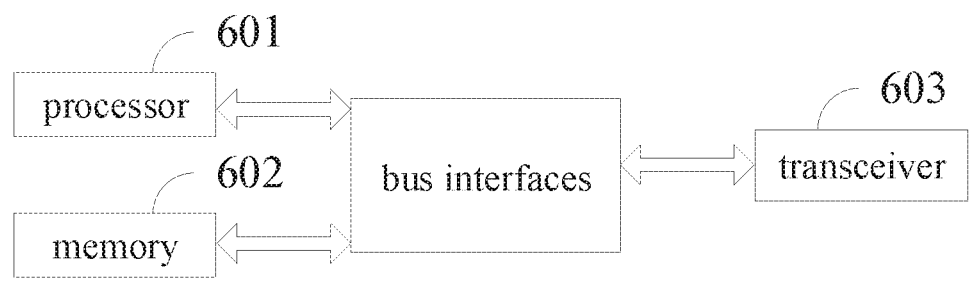
FIG. 6b is a structure schematic diagram of another device for determining buffer status provided by an embodiment of the present disclosure.

In the FIG. 6b, the bus architecture may include any numbers of buses and bridges connected to each other, and one or more processors represented by the processor 601 and various circuits of the memories represented by the memory 602 are linked together. The bus architecture may also link the other various circuits together, such as the peripheral equipment, voltage stabilizers and power management circuits, which are all well known in this field, and thus will not be further described herein. Bus interfaces provide interfaces. The transceiver 603 may include a plurality of elements, namely including a transmitter and a receiver, and provide devices communicating with other devices on the transmission medium. The processor 601 is responsible for managing the bus architecture and generally processing, and the memory 602 may store the data for the processor 601 executing operation.

The processor 601 in the embodiment of the present disclosure may be a CPU, an ASIC, a FPGA or a CPLD.

Figure 7:
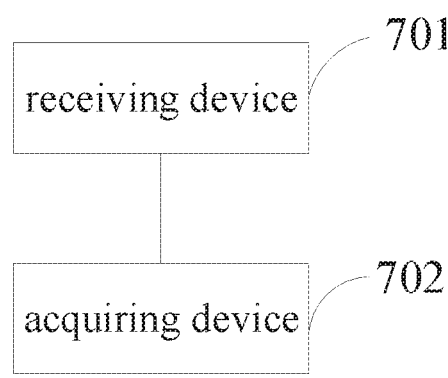
FIG. 7 is a structure schematic diagram of further device for determining buffer status provided by an embodiment of the present disclosure.

Based on the same concept, an embodiment of the present disclosure provides another buffer status determination device, such as network side equipment (e.g., a base station), as shown in FIG. 7, which may include:

a receiving device 701 for receiving buffer status of a buffer status reporting procedure performed by a terminal based on buffer status of different logic channel groups, where different logic channels, corresponding to any RB with a duplication function configured or activated on a link, belong to the different logic channel groups; and an acquiring device 702 for acquiring current buffer status of the terminal from the buffer status of the buffer status reporting procedure performed based on the buffer status of the different logic channel groups.

In the embodiment of the present disclosure, both the above-mentioned receiving device 701 and acquiring device 702 can be implemented by physical structures such as the processor.

It should be noted that any memory mentioned in the embodiment of the present disclosure may include a ROM and a RAM, and provides the program commands and data stored in the memory for the processor. In the embodiment of the present disclosure, the memory can be used for storing the procedure of any method provided by the embodiments of the present disclosure.

The processor is for executing any method provided by the embodiments of the present disclosure according to the obtained program commands through calling the program commands stored in the memory.

Based on the same concept, an embodiment of the present disclosure provides a buffer status reporting method; since the principle of the method is similar to that of the above-mentioned buffer status reporting device, the specific implementation of the method can refer to the specific embodiment of the buffer status reporting device, and repetitive points will not be repeated here.

Figure 8:
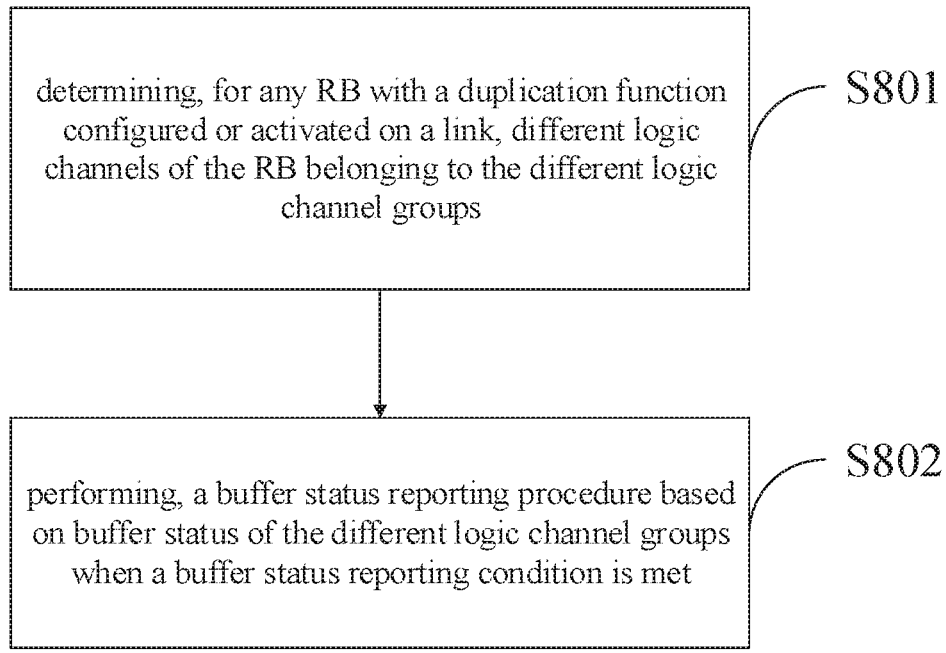
FIG. 8 is a flow schematic diagram of a method for performing a buffer status reporting procedure provided by an embodiment of the present disclosure.

In some embodiments, the buffer status reporting method provided by an embodiment of the present disclosure, as shown in FIG. 8, may include:

S801, determining, for any RB with a duplication function configured or activated on a link, different logic channels of the RB belonging to the different logic channel groups; and S802, performing, a buffer status reporting procedure based on buffer status of the different logic channel groups when a buffer status reporting condition is met.

In one embodiment, the link is the terminal-to-terminal Sidelink, or the Uu link from the terminal to the network side equipment.

In one embodiment, the operation of performing the buffer status reporting procedure based on buffer status of the different logic channel groups includes:

performing the buffer status reporting procedure for the different logic channel groups based on buffer status of the different logic channels of the RB with duplication function configured or activated.

In one embodiment, the operation of performing the buffer status reporting procedure for the different logic channel groups based on buffer status of the different logic channels of the RB with duplication function configured or activated, includes:

sending, for the Uu link, a BSR MAC CE, where the BSR MAC CE includes information of the different logic channel groups, and information of buffer status corresponding to each of the different logic channel groups; and sending, for the Sidelink, a BSR MAC CE, where the BSR MAC CE includes a Destination L2 ID, information of one or more logic channel groups corresponding to the Destination L2 ID, and information of buffer status corresponding to each of the one or more logic channel groups.

In one embodiment, the operation of determining the different logic channels of the RB belonging to the different logic channel groups, includes:

determining the different logic channels of the RB belonging to the different logic channel groups according to a corresponding relationship between a logic channel of the RB and a logic channel group; or determining the different logic channels of the RB belonging to the different logic channel groups according to a calculation formula with regarding to a logic channel of the RB and a logic channel group.

In one embodiment, the calculation formula is as follows:

LCG ID=$A+M \times (i-1)$; or

LCG ID=$N-M \times (i-1)-A$;

where i represents an $i^{th}$ logic channel of the RB, LCG ID represents a serial number of a logic channel group to which the $i^{th}$ logic channel of the RB belongs, A represents a serial number of a logic channel group to which a first logic channel of the RB belongs, M represents number of the logic channels of the RB, N represents a maximum value of serial numbers of logic channel groups supported by system, i is less than or equal to M, and M is an integer greater than or equal to 2.

In one embodiment, the corresponding relationship and/or calculation formula is directly appointed according to the protocol, or configured by the network side equipment.

In one embodiment, when the corresponding relationship and/or the calculation formula is configured by the network side equipment, the method further includes:

receiving a configuration signaling carrying information of the corresponding relationship or the calculation formula from the network side equipment through a broadcast; or receiving a configuration signaling carrying information of the corresponding relationship or the calculation formula from the network side equipment through a dedicated signaling.

In one embodiment, if different types of links use different corresponding relationships or different calculation formulas, the broadcast or dedicated signaling carries the identification of the link.

In one embodiment, if different corresponding relationships or different calculation formulas are used for different destinations in a Sidelink, the broadcast or dedicated signaling carries a Destination L2 ID.

Based on the same concept, an embodiment of the present disclosure provides a buffer status determination method; since the principle of the method is similar to that of the above-mentioned buffer status determination device, the specific implementation of the method can refer to the specific embodiment of the buffer status determination device, and repetitive points will not be repeated herein.

Figure 9:
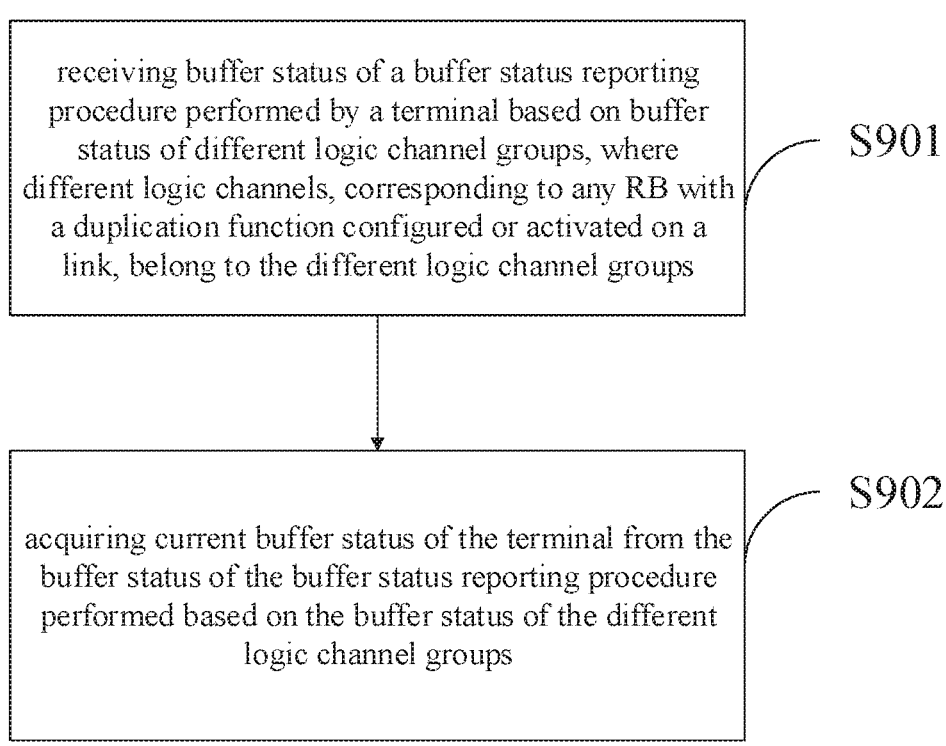
FIG. 9 is a flow schematic diagram of a method for determining buffer status provided by an embodiment of the present disclosure.

In some embodiments, the buffer status determination method provided by an embodiment of the present disclosure, as shown in FIG. 9, may include:

S901, receiving buffer status of a buffer status reporting procedure performed by a terminal based on buffer status of different logic channel groups, where different logic channels, corresponding to any RB with a duplication function configured or activated on a link, belong to the different logic channel groups; and S902, acquiring current buffer status of the terminal from the buffer status of the buffer status reporting procedure performed based on the buffer status of the different logic channel groups.

In one embodiment, the method may also include:

determining a plurality of different logic channel groups corresponding to the RB according to the information of the buffer status;

scheduling data corresponding to the different logic channel groups carried by the RB to different physical resources, according to the current buffer status of the terminal and a corresponding relationship between a logic channel of the RB and a logic channel group; or scheduling data corresponding to the different logic channel groups carried by the RB to different physical resources, according to the current buffer status of the terminal and a calculation formula with regarding to a logic channel of the RB and a logic channel group.

In one embodiment, the corresponding relationship and/or the calculation formula is directly appointed according to a protocol, or configured for the terminal after being determined by network side equipment.

In one embodiment, the mode of configuring the corresponding relationship or the calculation formula for the terminal may be as follows:

sending a configuration signaling carrying information of the corresponding relationship or the calculation formula to the terminal through the broadcast or dedicated signaling.

A data scheduling scheme will be described below in combination with specific embodiments.

First Embodiment

Figure 10:
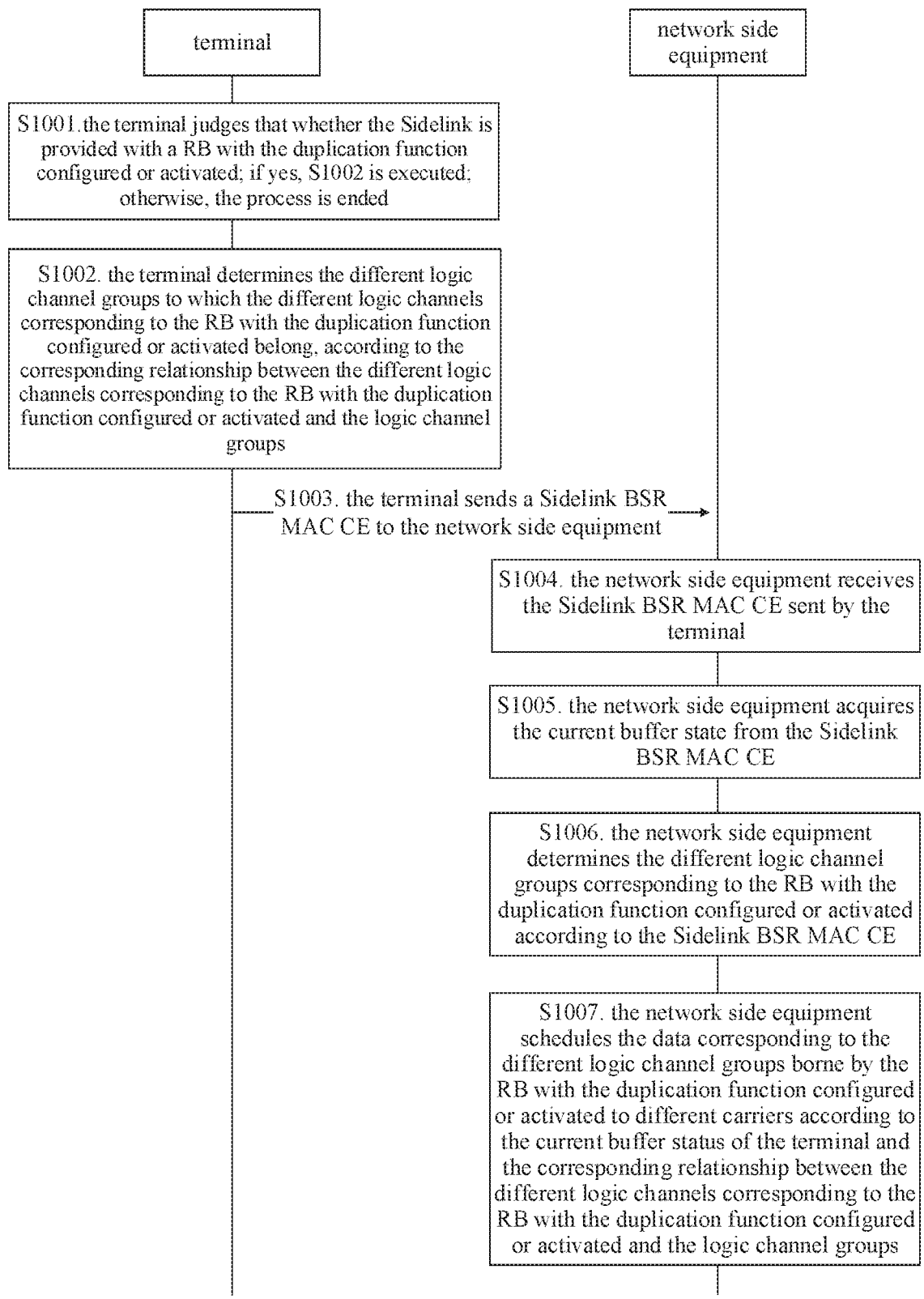
FIG. 10 is a flow diagram of interaction of a first embodiment provided by an embodiment of the present disclosure.

This embodiment is for the Sidelink, and takes the corresponding relationship, between the different logic channels corresponding to the RB with the duplication function configured or activated and the logic channel groups, which is directly appointed according to the protocol, as an example for illustration, and shown in combination with an interaction flow as shown in FIG. 10. The terminal in the embodiment of the present disclosure refers to a direct communication sending terminal.

S1001, the terminal judges that whether the Sidelink is provided with a RB with the duplication function configured or activated; if yes, S1002 is executed; otherwise, the process is ended;

S1002, the terminal determines the different logic channel groups to which the different logic channels corresponding to the RB with the duplication function configured or activated belong, according to the corresponding relationship between the different logic channels corresponding to the RB with the duplication function configured or activated and the logic channel groups;

S1003, the terminal sends a Sidelink BSR MAC CE to the network side equipment;

S1004, the network side equipment receives the Sidelink BSR MAC CE sent by the terminal;

S1005, the network side equipment acquires the current buffer status from the Sidelink BSR MAC CE;

S1006, the network side equipment determines the different logic channel groups corresponding to the RB with the duplication function configured or activated according to the Sidelink BSR MAC CE; and S1007, the network side equipment schedules the data corresponding to the different logic channel groups borne by the RB with the duplication function configured or activated to different carriers, according to the current buffer status of the terminal and the corresponding relationship between the different logic channels corresponding to the RB with the duplication function configured or activated and the logic channel groups.

Second Embodiment

This embodiment is for the Sidelink, and takes the calculation formula, with regarding to the different logic channels corresponding to the RB with the duplication function configured or activated and the logic channel groups, which is directly appointed according to the protocol, as an example for illustration. The terminal in the embodiment of the present disclosure refers to the direct communication sending terminal.

One of differences between the second embodiment and the first embodiment lies in the S1002. In the second embodiment, this step is that the terminal determines the different logic channel groups to which the different logic channels corresponding to the RB with the duplication function configured or activated belong according to the calculation formula with regarding to the different logic channels corresponding to the RB with the duplication function configured or activated and the logic channel groups.

Second of the differences between the second embodiment and the first embodiment lies in the S1007. In the second embodiment, this step is that the network side equipment schedules the data corresponding to the different logic channel groups borne by the RB with the duplication function configured or activated to the different carriers according to the current buffer status of the terminal and the calculation formula with regarding to the different logic channels corresponding to the RB with the duplication function configured or activated and the logic channel groups.

Third Embodiment

This embodiment is for the Sidelink, and takes the relationship, between the different logic channels corresponding to the RB with the duplication function configured or activated and the logic channel groups, which is configured to the terminal by the network side equipment, as an example for illustration. The terminal in the embodiment of the present disclosure refers to the direct communication sending terminal.

The difference between the third embodiment and the first embodiment is that, before the S1001, the method further includes the following step that the network side equipment sends, the configuration signaling carrying the information of the corresponding relationship between the different logic channels corresponding to the RB with the duplication function configured or activated and the logic channel groups, to the terminal through the broadcast or dedicated signaling.

Fourth Embodiment

This embodiment is for the Sidelink, and takes the calculation formula, with regarding to the different logic channels corresponding to the RB with the duplication function configured or activated and the logic channel groups, which is configured to the terminal by the network side equipment, as an example for illustration.

The difference between the fourth embodiment and the third embodiment is that the corresponding relationship in the fourth embodiment is agreed upon as the calculation formula in a fifth embodiment.

Fifth Embodiment

Figure 11:
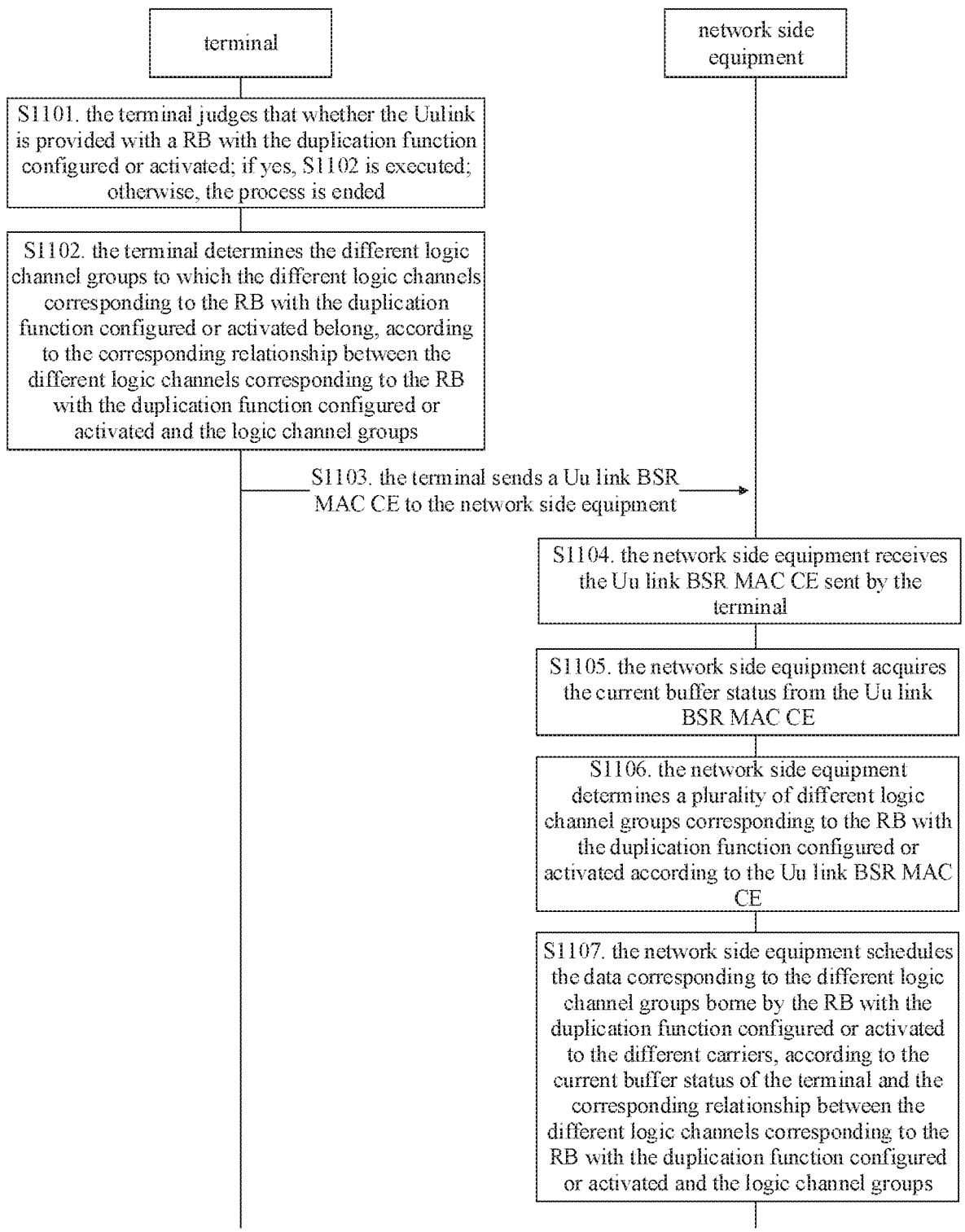
FIG. 11 is a flow diagram of interaction of a fifth embodiment provided by an embodiment of the present disclosure.

This embodiment is for the Uulink, and takes the relationship, between the different logic channels corresponding to the RB with the duplication function configured or activated and the logic channel groups, which is directly appointed according to the protocol, as an example for illustration, and shown in combination with an interaction flow as shown in FIG. 11.

S1101, the terminal judges that whether the Uulink is provided with a RB with the duplication function configured or activated; if yes, S1102 is executed; otherwise, the process is ended;

S1102, the terminal determines the different logic channel groups to which the different logic channels corresponding to the RB with the duplication function configured or activated belong, according to the corresponding relationship between the different logic channels corresponding to the RB with the duplication function configured or activated and the logic channel groups;

S1103, the terminal sends a Uu link BSR MAC CE to the network side equipment;

S1104, the network side equipment receives the Uu link BSR MAC CE sent by the terminal;

S1105, the network side equipment acquires the current buffer status from the Uu link BSR MAC CE;

S1106, the network side equipment determines a plurality of different logic channel groups corresponding to the RB with the duplication function configured or activated according to the Uu link BSR MAC CE; and S1107, the network side equipment schedules the data corresponding to the different logic channel groups borne by the RB with the duplication function configured or activated to the different carriers, according to the current buffer status of the terminal and the corresponding relationship between the different logic channels corresponding to the RB with the duplication function configured or activated and the logic channel groups.

Sixth Embodiment

This embodiment is for the Uulink, and takes the calculation formula, with regarding to the different logic channels corresponding to the RB with the duplication function configured or activated and the logic channel groups, which is appointed according to the protocol, as an example for illustration.

One of the differences between the sixth embodiment and the fifth embodiment lies in the S1102, and in the sixth embodiment, this step should be that the terminal determines the different logic channel groups to which the different logic channels corresponding to the RB with the duplication function configured or activated belong, according to the calculation formula with regarding to the different logic channels corresponding to the RB with the duplication function configured or activated and the logic channel groups.

Second of the differences between the sixth embodiment and the fifth embodiment lies in the S1107, and in the sixth embodiment, this step should be that the network side equipment schedules the data corresponding to the different logic channel groups borne by the RB with the duplication function configured or activated to the different carriers, according to the current buffer status of the terminal and the calculation formula with regarding to the different logic channels corresponding to the RB with the duplication function configured or activated and the logic channel groups.

Seventh Embodiment

This embodiment is for the Uulink, and takes the relationship, between the different logic channels corresponding to the RB with the duplication function configured or activated and the logic channel groups, which is configured to the terminal by the network side equipment, as an example for illustration.

The difference between the seventh embodiment and the sixth embodiment is that, before the S1101, the method further includes the following step that the network side equipment sends the configuration signaling carrying the information of the corresponding relationship between different logic channels corresponding to the RB with the duplication function configured or activated and the logic channel groups to the terminal through the broadcast or dedicated signaling.

Eighth Embodiment

This embodiment is for the Uulink, and takes the calculation formula, with regarding to the different logic channels corresponding to the RB with the duplication function configured or activated and the logic channel groups, which is configured to the terminal by the network side equipment, as an example for illustration.

The difference between the eighth embodiment and the seventh embodiment is that the corresponding relationship in the seventh embodiment is agreed upon as the calculation formula in the eighth embodiment.

An embodiment of the present disclosure also provides a computer storage medium in which computer executable commands are stored, and the computer executable commands enable a computer to execute any above-mentioned method.

The computer storage media may be any available medium or data storage equipment that can be accessed by the computer, including, but not limited to, a magnetic memory (such as a floppy disk, a hard disk, a magnetic tape and a magneto-optical disk (MO)), an optical memory (such as a CD, a DVD, a BD and an HVD), and a semiconductor memory (such as a ROM, an EPROM, EEPROM, a non-volatile memory (NAND FLASH) and a solid state drive (SSD).

It should be noted that the terminal mentioned in the embodiments of the present disclosure may also be called User Equipment (UE), a Mobile Station (MS), a mobile terminal, etc., the terminal may In one embodiment be equipped with the capability of communicating with one or more core networks via a Radio Access Network (RAN), e.g., the terminal may be a mobile phone (or called a cellular telephone) or a mobile computer, e.g., the terminal also may be a portable, pocket-sized, hand-held, computer-built or vehicle-mounted mobile device.

The network side equipment may be the base station (e.g., an access point), which refer to the equipment communicating with the wireless terminal via one or more sectors over an air interface in an access network. The base station may be used for carrying out mutual conversion on received air frames and IP packets, and serves as a router between the wireless terminal and the rest of the access network, where the rest of the access network may include an Internet Protocol (IP) network. The base station may also coordinate attribute management of the air interface. For example, the base station may be a Base Transceiver Station (BTS) in GSM or CDMA, may be a base station (NodeB) in WCDMA, may also be an evolutional Node B (NodeB or eNB or e-NodeB, evolutional Node B) in LTE, and is not limited in the embodiments.

The processing flow of the method can be realized by the software program that may be stored in the storage medium, and when the stored software program is called, the steps of the method are executed.

In conclusion, for the RB with the duplication function configured or activated, the different logic channel groups to which the different logic channels corresponding to the RB belong are determined, so that the buffer status can be reported based on the logic channel groups, after receiving the reported buffer status, the network side equipment can schedule the data of the different logic channels corresponding to the RB with the duplication function configured or activated to the different physical resources for transmission, and thus transmission delay is reduced while the reliability of data transmission is improved.

The embodiments of the present disclosure may be provided as a method, system, or computer program product. Thus, the present disclosure may take the form of an entirely hardware embodiment, an entirely software embodiment, or an embodiment combining software and hardware aspects. Moreover, the present disclosure may take the form of the computer program product implemented on one or more computer-usable storage media (including, but not limited to, the magnetic disk memory and the optical memory, etc.) having computer-usable program codes.

The present disclosure is described with reference to the flow diagrams and/or block diagrams of the methods, equipment (systems), and computer program products according to the embodiments of the present disclosure. It should be understood that each flow and/or block in the flow diagrams and/or block diagrams and combinations of the flows and/or blocks in the flow diagrams and/or block diagrams can be implemented by the computer program commands. These computer program commands may be provided for a processor of a general purpose computer, a special purpose computer, an embedded processor or other programmable data processing equipment to generate a machine, so that the command executed by the processor of the computer or other programmable data processing equipment produces a device for implementing functions specified in one or more flows of the flow diagram and/or one or more blocks of the block diagram.

These computer program commands may also be stored in a computer-readable memory that can direct the computer or other programmable data processing equipment to function in a particular manner, so that the commands stored in the computer-readable memory produce a manufactured article including a command device, and the command device implements the functions specified in one or more flows of the flow diagram and/or one or more blocks of the block diagram.

These computer program commands may also be loaded to the computer or other programmable data processing equipment to cause a series of operation steps to be carried out on the computer or other programmable equipment to produce a computer-implemented process, so that the command executed on the computer or other programmable equipment provides steps for implementing the functions specified in one or more flows of the flow diagram and/or one or more blocks of the block diagram.

In one embodiment, various modifications and variations to the present disclosure without departing from the spirit and scope of the present disclosure can be made. Therefore, if these modifications and variations of the present disclosure fall within the scope of the claims of the present disclosure and equivalent technologies thereof, the present disclosure is also intended to include these modifications and variations.

What is claimed is:

1. A buffer status reporting method, comprising:
    determining, for any radio bearer (RB) with duplication function configured or activated on a link, different logical channels of the RB belonging to different logic channel groups; and
    performing a buffer status reporting procedure based on buffer status of the different logic channel groups when a buffer status reporting condition is met;
    wherein the determining the different logic channels of the RB belonging to the different logic channel groups comprises:
    determining the different logic channels of the RB belonging to the different logic channel groups according to a calculation formula with regarding to a logic channel of the RB and a logic channel group;
    wherein the calculation formula is as follows:

LCG ID=$A+M\times(i-1)$; or

LCG ID=$N-M\times(i-1)-A$;

wherein i represents an ith logic channel of the RB, LCG ID represents a serial number of a logic channel group to which the ith logic channel of the RB belongs, A represents a serial number of a logic channel group to which a first logic channel of the RB belongs, M represents a number of the logic channels of the RB, N represents a maximum value of serial numbers of logic channel groups supported by system, i is less than or equal to M, and M is an integer greater than or equal to 2.

2. The method according to claim 1, wherein:
    the link is a direct communication link from a terminal to another terminal (Sidelink), or
    the link is a communication link from a terminal to a network side equipment (Uu link).

3. The method according to claim 2, wherein the performing the buffer status reporting procedure based on the buffer status of the different logic channel groups comprises:
    performing the buffer status reporting procedure for the different logic channel groups based on buffer status of the different logic channels of the RB with duplication function configured or activated.

4. The method according to claim 3, wherein the performing the buffer status reporting procedure for the different logic channel groups based on the buffer status of the different logic channels of the RB with duplication function configured or activated, comprises:
    sending, for the network side Uu link, a buffer status reporting media access control control element (BSR MAC CE), wherein the BSR MAC CE comprises information of the different logic channel groups, and information of buffer status corresponding to each of the different logic channel groups; and
    sending, for the Sidelink, a BSR MAC CE, wherein the BSR MAC CE comprises a Destination L2 ID, information of one or more logic channel groups corresponding to the Destination L2 ID, and information of buffer status corresponding to each of the one or more logic channel groups.

5. A non-transitory computer storage medium, wherein the computer storage medium stores computer executable commands, and the computer executable commands enable a computer to execute the method according to claim 1.

6. The method according to claim 1, wherein the calculation formula is directly appointed according to a protocol or configured by the network side equipment.

7. The method according to claim 6, wherein when the calculation formula is configured by the network side equipment, the method further comprises:
    receiving a configuration signaling carrying information of the calculation formula from the network side equipment through a broadcast; or
    receiving a configuration signaling carrying information of the calculation formula from the network side equipment through a dedicated signaling.

8. The method according to claim 7, wherein when different types of links use different calculation formulas:
    the broadcast carries an identification of the link; or
    the dedicated signaling carries an identification of the link.

9. The method according to claim 7, wherein when different calculation formulas are used for different destinations in a Sidelink:
    the broadcast carries a Destination L2 ID; or
    the dedicated signaling carries a Destination L2 ID.

10. A buffer status determination method, comprising:
    receiving buffer status of a buffer status reporting procedure performed by a terminal based on buffer status of different logic channel groups, wherein different logic channels, corresponding to any RB with a duplication function configured or activated on a link, belong to the different logic channel groups; and
    acquiring current buffer status of the terminal from the buffer status of the buffer status reporting procedure performed based on the buffer status of the different logic channel groups;
    determining a plurality of different logic channel groups corresponding to the RB according to the buffer status;
    scheduling data corresponding to the different logic channel groups carried by the RB to different physical resources, according to the current buffer status of the terminal and a calculation formula with regarding to a logic channel of the RB and a logic channel group;
    wherein the calculation formula is as follows:

LCG ID=$A+M\times(i-1)$; or

LCG ID=$N-M\times(i-1)-A$ wherein i represents an $i^{th}$ logic channel of the RB, LCG ID represents a serial number of a logic channel group to which the $i^{th}$ logic channel of the RB belongs, A represents a serial number of a logic channel group to which a first logic channel of the RB belongs, M represents a number of the logic channels of the RB, N represents a maximum value of serial numbers of logic channel groups supported by system, i is less than or equal to M, and M is an integer greater than or equal to 2.

11. The method according to claim 10, wherein the calculation formula is directly appointed according to a protocol or configured for the terminal after being determined by a network side equipment.

12. The method according to claim 11, wherein a mode of configuring the calculation formula for the terminal is as follows:

sending a configuration signaling carrying information of the calculation formula to the terminal through a broadcast; or sending a configuration signaling carrying information of the calculation formula to the terminal through a dedicated signaling.

13. A buffer status reporting device, comprising:
a memory for storing program commands; and
a processor for calling the program commands stored in the memory to execute following operations according to obtained programs:
determining, for any radio bearer (RB) with duplication function configured or activated on a link, different logical channels of the RB belonging to different logic channel groups; and
performing, a buffer status reporting procedure based on buffer status of the different logic channel groups when a buffer status reporting condition is met;
wherein when determining the different logic channels of the RB belonging to the different logic channel groups, the processor is further for:
determining the different logic channels of the RB belonging to the different logic channel groups according to a calculation formula with regarding to a logic channel of the RB and a logic channel group;
wherein the calculation formula is as follows:

LCG ID=$A+M\times(i-1)$, or

LCG ID=$N-M\times(i-1)-A$ wherein i represents an $i^{th}$ logic channel of the RB, LCG ID represents a serial number of a logic channel group to which the $i^{th}$ logic channel of the RB belongs, A represents a serial number of a logic channel group to which a first logic channel of the RB belongs, M represents a number of the logic channels of the RB, N represents a maximum value of serial numbers of logic channel groups supported by system, i is less than or equal to M, and M is an integer greater than or equal to 2.

14. The device according to claim 13, wherein:
the link is a Sidelink, or
the link is a Uu link.

15. The device according to claim 14, wherein when the buffer status reporting procedure is performed based on the buffer status of the different logic channel groups, the processor is further for:
performing the buffer status reporting procedure for the different logic channel groups based on buffer status of the different logic channels of the RB with duplication function configured or activated.

16. The device according to claim 15, wherein when the buffer status reporting procedure is performed for the different logic channel groups based on buffer status of the different logic channels of the RB with duplication function configured or activated, the processor is further for:
sending, for the Uu link, a BSR MAC CE, wherein the BSR MAC CE comprises information of the different logic channel groups, and information of the buffer states corresponding to each of the different logic channel groups; and
sending, for the Sidelink, a BSR MAC CE, wherein the BSR MAC CE comprises a Destination L2 ID, information of one or more logic channel groups corresponding to the Destination L2 ID, and information of buffer status corresponding to each of the one or more logic channel groups.

17. The device according to claim 13, wherein the calculation formula is directly appointed according to a protocol or configured by the network side equipment.

18. The device according to claim 17, wherein when the calculation formula is configured by the network side equipment, the processor is further for:
receiving a configuration signaling carrying information of the calculation formula from the network side equipment through a broadcast; or
receiving a configuration signaling carrying information of the calculation formula from the network side equipment through a dedicated signaling.

19. The device according to claim 18, wherein when different types of links use different calculation formulas:
the broadcast carries an identification of the link; or
the dedicated signaling carries an identification of the link.

20. The device according to claim 18, wherein when different calculation formulas are used for different target terminals in a Sidelink:
the broadcast carries a Destination L2 ID; or
the dedicated signaling carries a Destination L2 ID.

21. A buffer status determination device, comprising:
a memory for storing program commands; and
a processor for calling the program commands stored in the memory to execute following operations according to obtained programs:
receiving buffer status of a buffer status reporting procedure performed by a terminal based on buffer status of different logic channel groups, wherein different logic channels, corresponding to any RB with a duplication function configured or activated on a link, belong to the different logic channel groups; and
acquiring current buffer status of the terminal from the buffer status of the buffer status reporting procedure performed based on the buffer status of the different logic channel groups;
determining a plurality of different logic channel groups corresponding to the RB according to the buffer status;
scheduling data corresponding to the different logic channel groups carried by the RB to different physical resources, according to the current buffer status of the terminal and a calculation formula with regarding to a logic channel of the RB and a logic channel group;
wherein the calculation formula is as follows:

LCG ID=$A+M\times(i-1)$; or

LCG ID=$N-M\times(i-1)-A$ wherein i represents an $i^{th}$ logic channel of the RB, LCG ID represents a serial number of a logic channel group to which the $i^{th}$ logic channel of the RB belongs, A represents a serial number of a logic channel group to which a first logic channel of the RB belongs, M represents a number of the logic channels of the RB, N represents a maximum value of serial numbers of logic channel groups supported by system, i is less than or equal to M, and M is an integer greater than or equal to 2.

22. The device according to claim 21, wherein the calculation formula is directly appointed according to a protocol or configured for the terminal after being determined by a network side equipment.

23. The device according to claim 22, wherein a mode of configuring the calculation formula for the terminal is as follows:

sending a configuration signaling carrying information of the calculation formula to the terminal through a broadcast; or sending a configuration signaling carrying information of the calculation formula to the terminal through a dedicated signaling.

\* \* \* \* \*